3,408,162
SUSPENSION OF SOLID IMPURITIES IN WET
PROCESS PHOSPHORIC ACID
William A. Satterwhite and Robert C. Mazurek, Lakeland
Fla., assignors, by mesne assignments, to Armour Agricultural Chemical Company, a corporation of Delaware
No Drawing. Filed Feb. 14, 1966, Ser. No. 527,043
6 Claims. (Cl. 23—165)

ABSTRACT OF THE DISCLOSURE

Wet process orthophosphoric acid contains metal impurities which tend to settle out on standing and also when the acid is concentrated to polyphosphoric acid metaphosphate solids are formed. To prevent such precipitation and build-up of solids, lignosulfonate is mixed with the wet process acid at a temperature of about 80–150° C.

---

This invention relates to the suspension of solid impurities in wet process phosphoric acid.

Undissolved solid impurities in wet process phosphoric acid consist primarily of gypsum, iron and aluminum phosphates and alkali fluosilicates. These impurities settle out in processing, storage, and shipment, and form a hard voluminous mass which is difficult and costly to remove. Further, such solids are commonly washed out of the containers and discarded, thus representing a substantial loss of $P_2O_5$ values. The problem becomes more acute when the feed acids are concentrated by evaporation of water to concentrated acids such as, for example, 54% $P_2O_5$ wet process phosphoric acid. The solid impurities are increased during the concentration operation and precipitate during such processing and during subsequent storage, etc., the impurities forming minute crystal nuclei which grow and agglomerate and deposit in the container, etc.

We have discovered that by adding a relatively small amount of alkaline salt of lignosulfonic acid to the wet process phosphoric acids, solids which normally precipitate with time are retained in suspension, thus effecting considerable savings during handling and in preventing loss of $P_2O_5$ values.

A primary object, therefore, of the invention is to provide a process for maintaining solid impurities in suspension and inhibiting subsequent growth of such impurities as crystals from supersaturated acid solutions. Another object is to provide a method for dispersing and holding in suspension undissolved solid impurities such as gypsum, iron and aluminum phosphates and alkali fluosilicates, etc. A further object is to provide a process for treating concentrated acid at an elevated temperature with an alkaline salt of lignosulfonic acid for inhibiting precipitation of solid impurities containing $P_2O_5$ values. Other specific objects and advantages will appear as the specification proceeds.

In one embodiment of the invention, we add a small amount of lignosulfonate in solid or solution form to west process acid containing 29–56% $P_2O_5$ or higher at a temperature in the range of 80–150° C. or higher. The lignosulfonate is mixed with the solution in such a manner as to coat the solids and thus inhibit crystal growth and agglomeration.

The temperature, time, and amount of lignosulfonate mixed with the phosphoric acid depend upon the amount of solids present and the extent of size and agglomeration of the solids. For wet process phosphoric acid containing not more than 5% solids, we find that about 0.1–1.0% lignosulfonate is sufficient for inhibiting crystal growth and agglomeration. For wet process phosphoric acid containing more than 5% solids, a larger amount of lignosulfonate up to about 2% or more may be required.

For optimum results, we prefer to add the sulfonate over a period of from 5–15 minutes to the acid at a temperature of about 120–150° C. This is sufficient time to assure complete and rapid dissolution of the lignosulfonate. At this temperature, the acid has dissolved a maximum quantity of impurities and agglomerates are minimized. As the acid cools, the impurities crystallize and we find that the minute crystal nuclei are coated by the negatively-charged lignosulfonate additive. The imparted charge produces a repulsion between one particle and another and both agglomeration and crystal growth are inhibited.

As a specific example, wet process phosphoric acid containing about 54% $P_2O_5$ and treated with lignosulfonate as described above was centrifuged and the solids examined. Photomicrographs of the solids showed the lignosulfonate coating and the inhibition of agglomerates and crystal growth as compared with solids separated from untreated wet process phosphoric acid.

While we prefer the optimum temperatures of 120–150° C., the use of such temperatures is not practicable in plants using vacuum evaporation equipment wherein a temperature of 80–100° C. may be a maximum, and longer heating periods may be required for efficiently incorporating the lignosulfonate. For example, at about 88° C., from two to four hours may be required to achieve effective suspension of the solids.

As stated above, the amount of the lignosulfonate required is dependent upon the quantity of solids occurring in the acid, and since the range of solids contained in wet porcess phosphoric acid varies widely, it may be necessary to employ lignosulfonate in a quantity of from 0.5% to as high as 2% by weight. For wet process phosphoric acid having a solids content of about 2.5 to 5.0%, it is found that from 0.5–1.0% by weight of the lignosulfonate is sufficient, while acids containing solids below about 2.5% may require an estimated 0.1–0.5% of the lignosulfonate.

Any alkaline salt of lignosulfonic acid may be employed. Examples are the sodium, calcium, ammonium and potassium salts. We prefer to employ the sodium salt in providing the lignosulfonate treating agent.

Specific examples illustrative of our process may be set out as follows:

Example I

A wet process phosphoric acid containing 5% solids by weight was divided into a number of samples and each sample treated with sodium lignosulfonate varying from 0 to 1.0% and heated to 140° C. Samples of each mixture, along with an untreated control sample, were placed in 100 cm. settling columns. After nine days' standing, the control column contained 25 cm. sedimentation. Samples with less than 0.4% lignosulfonate showed sedimentation had occurred but less than in the control. With as low as 0.05% dispersant and with 16 cm. sedimentation, the mass was loose and flowed out of the column when the column was inverted, whereas with the untreated control the sedimentation was very hard and would not flow. At about 0.4%, about 5 cm. sedimentation was observed. At 1.0%, no sedimentation was present.

Example II

Tests were carried out as described in Example I except that lower temperatures in the range of 80–90° C. were employed. The effects of temperature on the degree of dispersion achieved in very significant. Settling tests were carried out in 38 cm./h. x 5 cm./d. columns. After five days' standing, each column was sampled. Nearly equal increments were decanted from the top to the bottom. Each increment was analyzed for solids content and results compared to those with the untreated control. The effect of time heating at 88° C., followed by five days' settling, is shown in the following table:

TABLE I

[Solids suspension in wet process phosphoric acid 1% lignosulfonate additions]

| Column Increment | 10 Minutes Heating | | 240 Minutes Heating | | Untreated Control | |
|---|---|---|---|---|---|---|
| | Increment, Wt. Gms. | Solids, Wt. Gms. | Increment, Wt. Gms. | Solids, Wt. Gms. | Increment, Wt. Gms. | Solids, Wt. Gms. |
| Top | 150.00 | 2.45 | 169.00 | 4.51 | 161.30 | 2.58 |
| 2 | 177.00 | 3.95 | 169.60 | 4.71 | 171.40 | 3.00 |
| 3 | 160.50 | 4.45 | 165.00 | 5.54 | 169.80 | 3.23 |
| 4 | 158.50 | 5.00 | 170.60 | 4.93 | 162.70 | 5.09 |
| Bottom | 174.60 | 10.06 | 165.40 | 6.27 | 173.90 | 11.88 |

The dispersant at 10 minutes heating is only slightly effective as compared with the control. Whereas, after 240 minutes heating, the dispersant is very effective.

The amount of the lignosulfonate required is largely dependent upon the quantity of solids in the acid.

Example III

Tests were carried on as described in Example II. A sample wet process phosphoric acid containing 2.4% solids and 0.5% lignosulfonate was found sufficient to effect suspension. In this test, both the untreated control and the treated acid were settled in columns for 5 days. The columns were separated into seven increments from the top to the bottom. The results are given in Table II below:

TABLE II

[Solids suspension in wet-process phosphoric acid 0.5% lignosulfonate addition (Solids Less than 3%) 88° C. for 4 hrs. followed by 5 days settling]

| Column Increment | Without Dispersant Addn. | | With Dispersant Additions | |
|---|---|---|---|---|
| | Increment, Wt. Grams | Increment Solids, Wt. Grams | Increment, Wt. Grams | Increment Solids, Wt. Grams |
| Top | 1,500 | 12 | 1,500 | 21 |
| 2 | 1,500 | 22 | 1,500 | 30 |
| 3 | 1,500 | 24 | 1,500 | 24 |
| 4 | 1,500 | 26 | 1,500 | 24 |
| 5 | 1,500 | 30 | 1,500 | 30 |
| 6 | 1,500 | 32 | 1,500 | 30 |
| Bottom | 1,500 | 134 | 1,500 | 45 |

The results of these tests show effective dispersion of the solids in wet-process phosphoric acid. In this case, as well as others, it has been noted that a fraction of the solids are sequestered by the dispersant.

The control acid contained 2.8% solids; after treatment with the dispersant the acid is reduced to 2.0% solids (avg. for seven increments).

Example IV

Suspension tests were carried on as described in Example II in an effort to suspend solids in acids containing between 3% and 5% solids. The results are set out in the following Table III:

TABLE III

[Solids suspension in wet-process phosphoric acid 1% lignosulfonate additions, 88° C. for 4 hrs. followed by 5 days settling]

| Column Increment | Acid with 3.1% Solids | | Acid with 3.8% Solids | | Acid with 4.4% Solids | |
|---|---|---|---|---|---|---|
| | Without Dispersant Solids, Percent | With Dispersant Solids, Percent | Without Dispersant Solids, Percent | With Dispersant Solids, Percent | Without Dispersant Solids, Percent | With Dispersant Solids, Percent |
| Top | 1.6 | 2.6 | 0.5 | 2.8 | 0.88 | 2.12 |
| 2 | 1.8 | 2.7 | 2.7 | 2.8 | 1.48 | 2.88 |
| 3 | 1.9 | 3.4 | 3.1 | 3.4 | 3.98 | 3.15 |
| 4 | 3.1 | 2.9 | 4.6 | 3.9 | 6.12 | 4.40 |
| Bottom | 7.0 | 3.5 | 8.1 | 5.7 | 9.68 | 4.99 |

The use of lignosulfonates as described in the foregoing examples represent an inexpensive, simple and direct means for handling the solids. The process eliminates the handling problem caused by the settling of these solids in process equipment and in shipping and storage, and avoids the losses arising out of their removal and equipment cleaning. Since the solids contain 20-45% $P_2O_5$, the suspension of such solids represents a major saving.

While, in the foregoing specification, we have set out procedure in considerable detail for the purpose of illustrating embodiments of the invention, it will be understood that such details may be varied widely by those skilled in the art without departing from the spirit of our invention.

We claim:

1. In a process for treating impurity-containing wet process phosphoric acid for maintaining impurities therein in suspension, the step of mixing about 0.1-2% by weight of lignosulfonate with said wet process phosphoric acid.

2. The process of claim 1 in which the acid is heated in the range of about 80-150° C. and the lignosulfonate mixed with the acid at said temperature.

3. The process of claim 1 in which the wet process phosphoric acid is heated to about 120-150° C.

4. The process of claim 1 in which the wet process phosphoric acid and lignosulfonate are heated to a temperature of about 80-100° C. for a period in excess of an hour.

5. In a process for treating wet process phosphoric acid to inhibit crystal growth and agglomeration, the steps of heating wet process phosphoric acid containing 2.5-5% solids to a temperature of about 80-150° C. and mixing lignosulfonate therewith in the amount of about 0.5-1% by weight.

6. The process of claim 1 in which the lignosulfonate is sodium lignosulfonate.

(References on following page)

References Cited

UNITED STATES PATENTS

| | | | |
|---|---|---|---|
| 2,929,777 | 3/1960 | Clevenger | 23—165 |
| 3,108,008 | 10/1963 | King et al. | 106—111 |
| 3,118,730 | 1/1964 | Nickerson | 23—165 |

OTHER REFERENCES

Baum et al., Chem. Abstracts, vol. 57, p. 10076b October 1962.

OSCAR R. VERTIZ, *Primary Examiner.*

A. GREIF, *Assistant Examiner.*